Feb. 7, 1928. Re. 16,870
T. H. NAKKEN
MEANS FOR TRANSFORMING LIGHT IMPULSES INTO ELECTRIC CURRENT IMPULSES
Original Filed Nov. 3, 1920 4 Sheets-Sheet 1
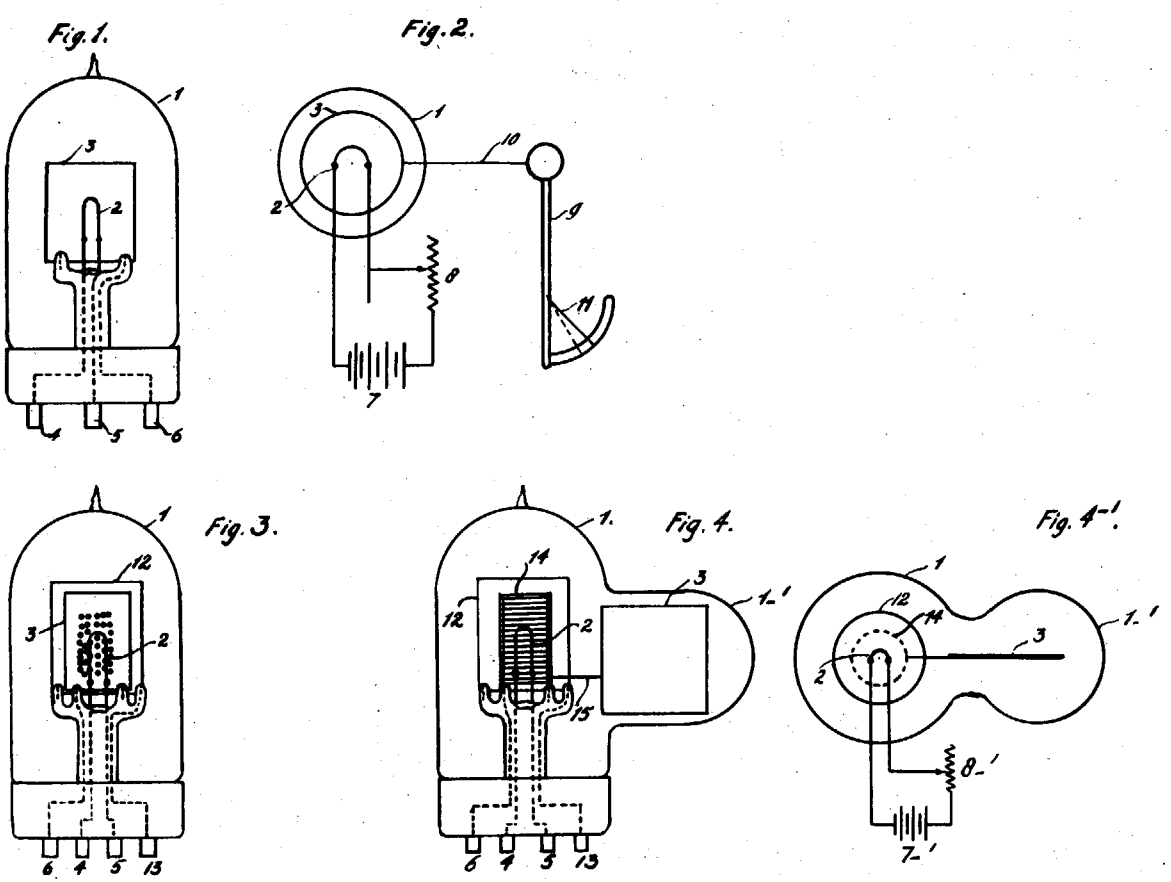
T.H.NAKKEN.
INVENTOR
BY
ATTORNEY Feb. 7, 1928.
Re. 16,870
T. H. NAKKEN
MEANS FOR TRANSFORMING LIGHT IMPULSES INTO ELECTRIC CURRENT IMPULSES
Original Filed Nov. 3, 1920 4 Sheets-Sheet 2
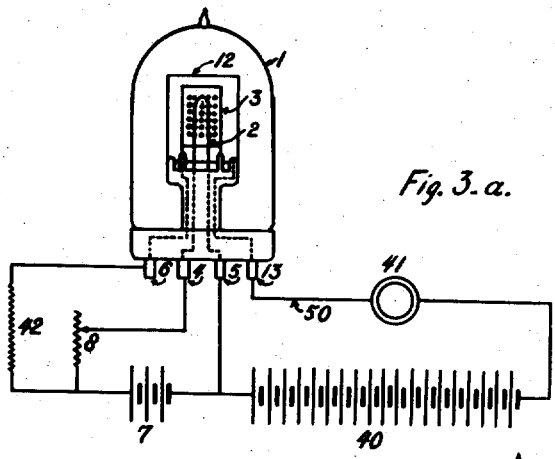
Fig. 3. a.
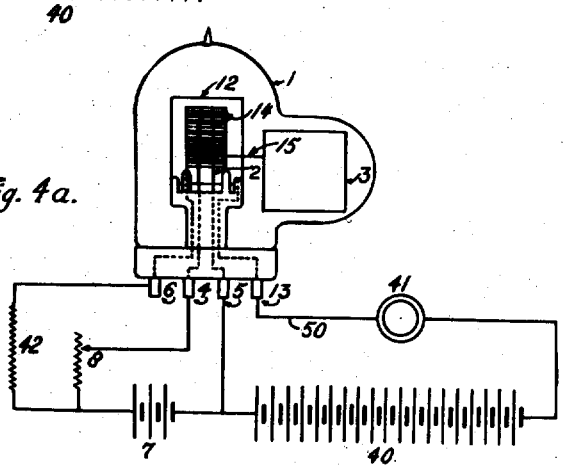
Fig. 4a.
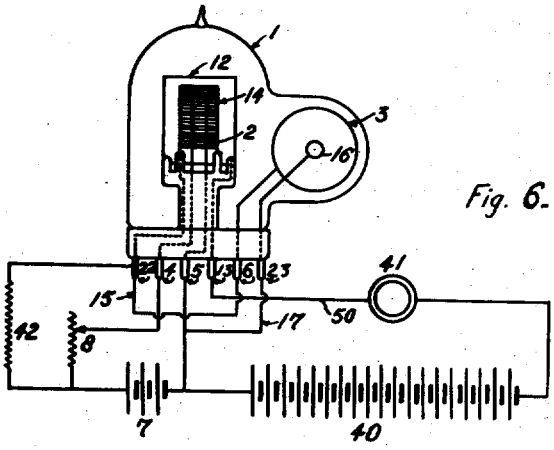
Fig. 6. a
INVENTOR.
THEODORUS H. NAKKEN.
BY
Leonard Ray
ATTORNEYS.

Feb. 7, 1928. Re. 16,870
T. H. NAKKEN
MEANS FOR TRANSFORMING LIGHT IMPULSES INTO ELECTRIC CURRENT IMPULSES
Original Filed Nov. 3, 1920 4 Sheets-Sheet 3
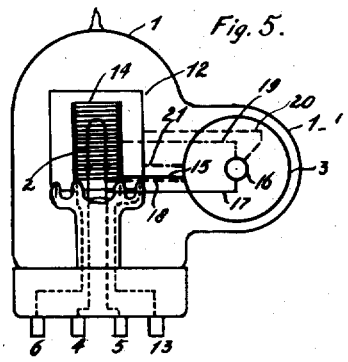
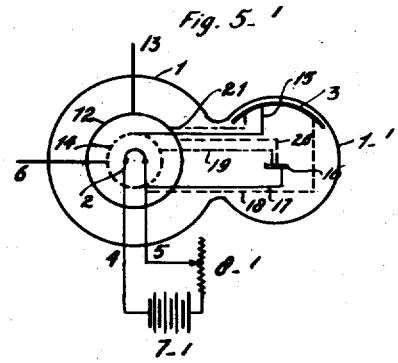
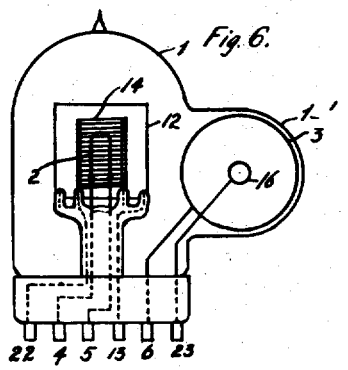
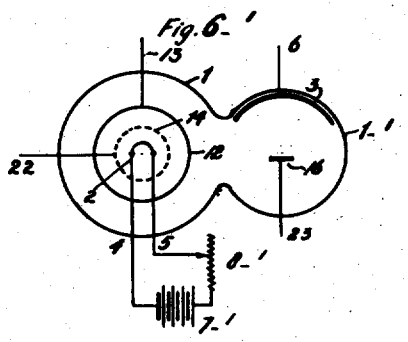
T. H. NAKKEN.
INVENTOR
BY
ATTORNEY Feb. 7, 1928. Re. 16,870
T. H. NAKKEN
MEANS FOR TRANSFORMING LIGHT IMPULSES INTO ELECTRIC CURRENT IMPULSES
Original Filed Nov. 3, 1920 4 Sheets-Sheet 4
Fig. 6-b.
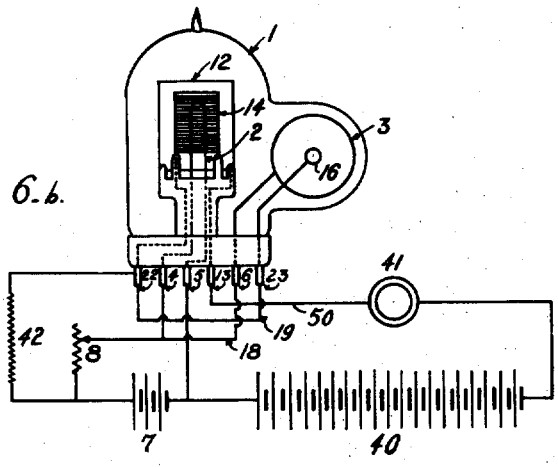
Fig. 6-c.
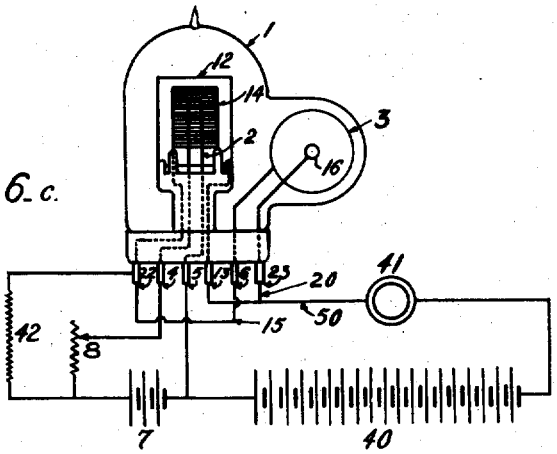
INVENTOR.
THEODORUS H. NAKKEN.
BY
ATTORNEYS.

Reissued Feb. 7, 1928. Re. 16,870

UNITED STATES PATENT OFFICE.

THEODORUS HENDRIK NAKKEN, OF JERSEY CITY, NEW JERSEY, ASSIGNOR TO NAAMLOOZE VENNOOTSCHAP NEDERLANDSCHE LUMINOTRON MAATSCHAPPIJ, OF ROTTERDAM, NETHERLANDS, A COMPANY OF NETHERLANDS.

MEANS FOR TRANSFORMING LIGHT IMPULSES INTO ELECTRIC-CURRENT IMPULSES.

Original No. 1,522,070, dated January 6, 1925, Serial No. 421,549, filed November 3, 1920. Application for reissue filed January 8, 1927. Serial No. 159,980.

Heretofore all attempts to transform light impulses into electric current impulses have functioned upon the principle of varying the dynamic flow of an electric current through a circuit including a source of current, a light sensitive cell and a translating device all in series with each other, the light sensitive cell being regarded and functioning in a manner similar to a microphone for modulating or varying the dynamic flow of current responsively to sound variations. Many light sensitive cells per se have been capable of controlling only substantially negligible variations of such dynamic flow.

Before my invention the selenium cell practically has been the only practical means for transforming light impulses into electric current impulses. This cell has the limitation of sluggishness or inertia and incapability of being adjusted once it has been completed. It is incapable of responding at all to light variations much more rapid than 1000 per second. Such cells are of no value for the solution of quite a number of highly important problems such as the talking film, the rapid action telephotography, television, and so forth.

My invention is based upon the combining of two inherent characteristics, one inherent characteristic of a photo-electric body and one inherent characteristic of the thermionic relay, by which latter I mean an apparatus comprising an electron emitting cathode, a grid and a plate in thermionic cooperative array, with a plate circuit having a source of direct current, the strength of current flow in which circuit is controlled by the potential of said grid.

Many metals emit or shed electrons when exposed to light, some when exposed to ordinary light and others when exposed to ultra violet rays. This so-called photo-electric or Hallwack effect is very strong with the alkaline metals, and with their amalgams. The emission or shedding of the electrons from such bodies is instantaneous in response to the impingement of the light. The number of electrons emitted per unit of time depends upon the intensity of the light and the area of the surface of the body exposed to the light.

Heretofore a photo-electric body carrying a predetermined negative charge, has been slowly discharged into an indicator under the influence of star-light acting over a long period of time, to indicate the amount of light received from such star.

On the other hand, the characteristic of the photo-electric body which I utilize in my invention is the instantaneous change of static potential of the photo-electric body occasioned by the instantaneous shedding of electrons in response to received light. The characteristic inherent in the thermionic relay which I utilize in my invention is that relatively slight static potential changes of the grid effect unexpectedly large but corresponding fluctuations in the strength of a dynamic current flow in the plate circuit. My invention therefore contemplates the association of the grid-action of a thermionic relay with the potential functioning of a photo-electric body in response to light variations.

For the practical carrying out of my invention it is also necessary that a source of charge be provided in a suitable manner to reestablish and tend to maintain normal condition of charge and potential upon the photo-electric body and the grid of the thermionic relay. It is preferable that this source function as quickly or as nearly instantaneously after the cessation of the light effect in shedding electrons as is possible. It is of course to be understood that the need for this rapidity of recovery of normal potential and normal charge of these elements is dependent only upon the rapidity of the light fluctuations to be translated. I therefore understand that there are various degrees towards which perfect functioning may approach. I have contemplated, at least theoretically, that for the most nearly perfect combination, such means would comprise a thermionic relay in which the grid was also a photo-electric body shedding electrons instantaneously in response to impinging light and instantaneously recovering them after the removal of light to produce a normal charge largely out of the same field of electrons employed for operating the thermionic relay.

As a rule, the electron field in thermionic relays is dependent largely upon heat excitation of a cathode to such a degree that a temperature is required higher than that compatible with a solid state for most of the satisfactory photo-electric bodies. I therefore contemplate as preferable a physical separation between the potential varying photo electric body and the potential varying grid of the relay, so that I can fabricate the grid out of the most suitable high temperature resisting metal and the photo-electric body of the most suitable light responsive material, even such that is meltable at a low temperature and by its separation be maintained, if necessary, at a lower temperature by artifical cooling.

All that is necessary to be done is to provide an electric connection between the photo-electric body and the grid of such a character as will effect an instantaneous potential change of the grid in response to a controlling potential change of the photo-electric body (This usually means a low resistance conductive connection.) and also to provide a stabilizing source tending to maintain a negative charge upon charge upon said photo-electric body.

The shedding of electrons by a photo-electric body causes a reduction of its negative charge and potential. If the electrons shed by a photo-electric body in response to light are caused to collect upon an electrode, obviously the negative charge and potential of such electrode increases. I therefore contemplate as within the scope of my invention the utilization of this consequent increase in negative charge upon such an electrode in combination with the grid of a thermionic relay. In fact, I claim broadly the combination of any body, the potential of which increases or decreases due to photo-electric action, with the grid of a thermionic relay and so associated with any suitable recovering source of charge either positive or negative as to effect a resumption of normal potential condition after the effect of the light has ceased.

The most practical conditions for the maintenance of sensitive photo-electric effect on a photo-electric body I believe to be provided by enclosing the photo-electric body in a bulb through which the action of light to which the device is to be responsive can pass freely and from which bulb the gaseous content has been evacuated to effect a substantially perfect vacuum for a hard condition or at least rarified and with the residual gas a neutral gas such as helium, argon, etc., for a soft condition. In other words provision should be made to provide a cooperative atmosphere. I also prefer that the photo-electric body be associated with an electrode for collecting the emitted electrons also within the evacuated bulb. I have found that a satisfactory source for the charging of the photo-electric body is an electron emitting cathode such as an incandescent filament, although, as will hereinafter be described, certain circuit connections render negative charging by free electrons unnecessary because the necessary connections of batteries incidental to the circuit, such as the so-called B battery of the plate circuit provides an adequate source of charge for the photo-electric body.

I have found, in effect, that the ways and modifications of applying my principle of transferring instantaneously the effect of static potential changes of a body functioning under the influence of photo-electric phenomena to the controlling element or grid of a thermoinic relay are very many, too numerous for complete description and illustration. I have therefore, in the following specification, described in detail illustrative ways and circuits, perhaps in error leaning towards an illustration and description of the more nearly theoretically perfect arrangements, rather than to the more obvious. The above and further objects of my invention will be apparent from the illustative embodiments described more in detail in the following specification in connection with the accompanying drawings which form a part hereof, and in which like characters designate corresponding parts in the several figures. It is to these illustrative embodiments that my claims are directed merely for purposes of illustration and not limitation. In the drawings Fig. 1 is a diagrammatical side view of means forming a part of my invention; Fig. 2, is a diagrammatical view in top plan, showing the photo-electric body associated with a source of charge and connected with a potential indicator. Fig. 3, Fig. 4, Fig. 5, and Fig. 6 are elevations similar to Fig. 1 illustrating various forms of apparatus useful in connection with my invention; Figs. $4^1$, $5^1$, and $6^1$ are respectively diagrammatical views in top plan of the corresponding elevations shown in Figs. 4, 5 and 6 drawn in a manner similar to the diagrammatical top plan of Fig. 2; Fig. $6^a$ is the circuit diagram of one assemblage of means embodying my invention in which the photo-electric cathode is connected with the grid; Fig. $6^b$ is another circuit embodying my invention in which the anode of the photo-electric couple is connected with the grid; and Fig. $5^c$ is another circuit diagram in which the anode of the photo-electric couple is directly connected with the plate.

In all figures; 1 is the glass or other suitable bulb which may be fully exhausted or filled with neutral gas, such as helium, argon, etc., under low pressure. If the bulb is fully exhausted it is called "hard", and if it is not, it is called "soft". 2 is a cathode capable of emitting electrons and is shown in all figures in the form of a filament capable of being heated, to incandescence if necessary, by the passage therethrough of an electric current supplied from a suitable source such as a battery 7, controllable by a variable resistance 8. 3 is a photo-electric plate, for instance of rubidium, hereinafter to be termed "body", "photo-electric body", "cathode body". 4 and 5 are the contact pins of the filament. 6 is a contact pin for the body.

When the filament 2 (see Fig. 2) is brought to incandescence owing to its connection with battery 7 and regulating resistance 8, the filament at once emits electrons, part of which reach the cathode body, 3. This cathode body 3 will hereby be negatively charged until a maximum is attained, and an equilibrium established, when the source of electrons will absorb as many electrons per unit of time as it emits. This charge upon the cathode body, although it is static, is a reality and can even be read as to its degree on a calibrated electroscope such as the electroscope 9 in Fig. 2 connected through a wire 10 with the cathode body 3. The leaf 11 of the electroscope will deflect and remain stationary in a given position. If now the body 3 is exposed to light, as by causing the same to shine upon it, it will instantaneously shed or emit a given number of electrons per unit of time. The kind of influence of the stream of electrons outflowing from the source of electrons here depicted, namely, the cathode 2 is such that a sufficiently high rate of influx of electrons to the cathode body 3, or in other words, a sufficiently high rate of negative charging of said cathode body 3 does not take place to make up for the rate of loss of electrons from this cathode body 3 when subjected to light. Therefore, the potential of the cathode body 3 drops and any instrument such as the electroscope 9 suitably linked therewith assumes a corresponding change in the present instance in Fig. 2, the leaf 11 moves back by gravity through a certain distance. When the light source is removed the original condition as to static potential is instantaneously restored. Probably the speed of restoration is augmented by the fact that at the instant when light ceases to shine upon the cathode body it is free to receive and does receive a charge not only from the source of electrons 2 but from free electrons just liberated from that body by the action of the light.

In fact, I have found that, owing to the presence of free electrons in the co-operating atmosphere about the cathode body, this cathode body cannot suffer from so-called "fatigue", such as is the case with the selenium cell. That is to say, said cathode body is always in condition for instantaneously emitting electrons and varying its potential in response to like variations thereupon.

Figs. 3 to 6 illustrate the apparatus, which are constructed in accordance with the invention and which, as later to be described, are adapted to transform potential variations of the photo-electric cathode body into electric current impulses which, in their turn may be transformed through any suitable device 41 in an arbitrary manner into other forms of energy. In Fig. 3, the body 3 is perforated, a plate 12 being provided within the bulb 1 and connected with a contact pin 13. Intermediate between filament 2 and plate 12 is the photo-electric cathode body 3.

If now the + pole of a battery 40 of say 40 to 100 volts (see Fig. 3–A) is connected with contact 13, and thence to plate 12, its − pole being connected with either lead 4 or 5 of the filament 2, then the latter when lit to incandescence by its battery 7 will cause a current to pass through this plate circuit. This plate circuit is shown only diagrammatically, and only for the purpose of illustrating connections with the apparatus, and not to exclude any of the well known adjuncts of a plate circuit. The amount of this so-called plate current depends upon the potential of the body 3, and slight variations of this potential will entail comparatively great variations of the plate current. This phenomenon need not be explained in detail because it is that characteristic of the vacuum valve or electron relay in which slight variations of the potential of the grid have this effect on the plate current and in the instance now being described the body 3 is functioning as a grid. But in this instance the body 3 is also functioning as a photo-electric body and its charge or potential is directly controlled by the light impulses. These light impulses themselves effect the emitting or shedding from this combination thing—photo-electric body and grid—of various numbers of electrons in proportion to the light impulses.

This embodiment of my invention therefore effects a transformation of light impulses into substantial electric current impulses in the plate circuit by means reduced to its simplest terms, a 3-element combination structure in which one of the elements has a dual nature and a dual function, that is, the combination grid body 3.

This construction is theoretically perfect in that both the photo-electric body and the grid are one and as one are located in the field between the cathode and the plate of the electronic relay, but there is a practical defect presently to be described. In fact, substantially the same theoretical perfection may be obtained even though the photo-electric body and the grid as one combination thing are not located between the filament and the plate, provided that the distance to the filament from this combination thing is smaller than the distance between the filament and the plate 12.

It is possible that the potential of the body 3 may attain such a high value as to render it advisable to provide for a leakage resistance 42, which is shown in Fig. 3[a] connected in the usual manner.

The disadvantage referred to above of a practical character for this theoretically good construction is primarily that photo-electric bodies as a rule are damaged by heat and as a rule heat is employed to excite the electron discharge from the cathode 2. If the distance from the cathode 2 to the body 3 is too small, the latter may be damaged by the heat of the former and in order to obviate this inconvenience, I may use other constructions, such for example, as those shown in Figs. 4 to 6. In such constructions the cathode body 3 may be placed at a distance from the cathode 2. The cathode body 3 may even be placed near the wall of its closing bulb so that it may be artificially cooled if necessary by means of a suitable fan, which would have been impossible with the unitary apparatus shown in Fig. 3.

Referring now particularly to Fig. 4 and with it being understood that what I have heretofore explained in regard to batteries, circuits, and leakage resistance, etc., is still applicable, in order that the increase in distance between cathode filament and photo-electric body may not interfere with the proper effect, I connect said photo-electric body 3 through a wire 15 with a heat resisting metallic member 14, the latter to serve in this case solely as the grid of a thermionic valve, while the former, the body 3, has placed upon it the segregated duty of functioning as a photo-electric body. It will be understood that this apparatus functions in quite the same manner as that illustrated in Fig. 3, but it has the great advantage that the grid member 14 may now be made of metal having a high fusing point as is customary in the fabrication of electron relays for the grid construction. I have illustrated one form of this physical separation of the body 3 from the grid 14 in Fig. 4 as to one form of its physical embodiment and diagrammatically in Fig. 4[a], as to its electrical functioning. In these figures I have found it convenient to designate the functioning means shown in the form of the connecting wire 15 as a link means associating said body 3 and said grid 14 and adapted to impart potential variations to said grid corresponding to those which take place on said body.

Another embodiment of the invention is shown in Fig. 5 in which the photo-electric cathode body 3 here is made in the shape of a concave mirror, in the focus of which is placed a small metal part 16 hereinafter called the anode of the photo-electric couple comprising the photo-electric cathode body 3, and this anode, together with the co-operating atmosphere necessarily associated with such electrodes. The provision of this anode allows of quite a number of different connections, while maintaining the physical separation between the photo-electric couple and the elements functioning as a thermionic valve. Some of these different connections will now be described more in detail, while others will be obvious from those described.

(*a*) See Fig. 6[a]. Assuming the cathode body 3 to be connected through suitable link means such as the wire 15 with the grid and the anode 16 through wire 17 with the cathode 2, it will be understood that electrons shed from said body 3 will reach the anode 16 to flow back through wire 17 to the cathode 2. The strength of this current is limited by the actual rate of electron emission from the photo-electric body 3 and in consequence is infinitesimal, but fortunately the functioning of the apparatus is not dependent upon this infinitesimal return flow of electrons because of the fact that in order for them to have left the cathode body 3, and because further of the fact that the recharging influence upon the body 3 is insufficient, a substantial lowering of the negative potential of the body 3 takes place, which in turn has its effect through the link means 15 upon the grid 14. It is the change of potential of the grid 4 responding to the change of potential of the body 3 which controls the strength of the appreciable current flow in the plate circuit from plate 12 supplied by battery 40.

(*b*) See Fig. 6[b]. The circuit described in connection wth Fig. 6[a] above may be reversed by connecting the cathode body 3 through a wire 18 with the filament or cathode 2 and the anode 16 through a suitable link means such as the wire 19 with the grid 14. In this circuit the opposite effect will be obtained. The shedding of electrons from the photo-electric body 3 decreases the potential of the anode 16, the effect of which is imparted to the grid 14. This in turn makes the usual current response in the plate circuit 50.

(*c*) See Fig. 6[c]. If the photo-electric body 3 is connected through wire 15 functioning as a suitable link means with grid 14 and the anode 16 is connected through wire 20 with the plate 12, then, owing to the emission of electrons from the body 3 due to light impulses, the following will take place:

1. The potential of the grid will be reduced, that is, it will have a smaller negative charge and in accordance with the usual functioning of my invention the strength of the plate current will be increased. In accordance with the usual functioning of the thermionic relay a greater number of electrons reach the plate directly.

2. Whatever electrons emitted from the body 3 reach the anode 16 are added to the plate circuit including the transforming device 41, which is to be understood as an effect in the right direction, notwithstanding the fact that the value of any so-called current formed by these anode collected electrons, is itself infinitesimal. In connection with this circuit, however, another important truth should be noted.

(*d*) The circuit just described in connection with Fig. 6[c], may be reversed by connecting the body 3 through wire 21 with the plate and the anode through wire 19 with the grid so that the opposite effect will then be realized. This circuit, however, is of importance only with such amplifying devices as those in which the filament emits positive particles instead of electrons. Such devices being extremely rare, little emphasis is placed upon this circuit.

(*e*) Assuming the body 3 not to be connected with any of the other elements and the anode 16 to be connected through wire 19 with the grid 14, then the electrons emitted by the body will be collected by the anode 16 to effect an increase in its negative charge and to effect a consequent increase of the negative charge of the grid 14. The electronic relay will then function according to its nature and there will be a decrease of substantial amount in the current through the plate circuit 50. This circuit is interesting in that it is the only one of circuits which is dependent for its functioning solely upon the reception of free electrons by the photo-electric body 3 for the recovery of its normal negative charge; that is, from free electrons from some such source as the filament 2. On the other hand, the other three circuits, 6[a], 6[b] and 6[c] are in fact independent for the resumptions of the normal negative charges upon their photo-electric cathode bodies 3 of any free electrons from the cathodes 2. This is of particular importance, particularly when I construct my electronic relay in one of its preferred forms, namely, that in which the plate not only acts as a barrier interposed between the filament 2 and the elements of the photo-electric couple, but is caused to constitute the wall of the bulb itself in closing the elements of this thermionic relay. This will be described more in detail later.

In these circuits 6[a], 6[b] and 6[c], two distinct classifications may be made. In the circuit of 6[b] the batteries must be so connected as to force an inexhaustible supply of electrons upon the photo-electric body 3 which can be supplied at such great rate that in this case its potential cannot be lowered materially by the action of light. In this circuit the element, the potential variations of which are employed for controlling the potential of the grid, is the anode. In the other two circuits, Figs. 6[a] and 6[c], however, the influence of the relatively infinite source of electrons, the batteries, is limited in its recharging effect upon the photo-electric cathode 3 by the high resistance of the leakage resistance 42. If this is physically present as a part of the circuit, and as has previously been described, or by the leakage path through the thermionic relay itself provided its atmosphere is "soft". A second recharging source of electrons 4, the cathode bodies of Figs. 6[a] and 6[c], is a conductive flow of electrons along the wire 15 from the grid 14, which receives them as free electrons from the cathode 2. In no instance is this influence in the recharging of the cathode body a current flow, and does not constitute the current pulsations into which I translate light pulsations.

In order that the above and still other connections may be effective without having to change the construction of the apparatus proper and when it is desired to combine all elements in one unitary structure, I preferably use apparatus as shown in Fig. 6. The body, the filament, the plate, the grid and the anode here are each connected independently with exterior contact pins. Contacts 22 and 23 are connected with the grid 14 and with the anode 16 respectively. The desired connections can now be made simply by connecting one contact pin with another through such circuits as may be desired. (See, for example, Figs. 6[a], 6[b] and 6[c].)

It is pertinent here to state that the apparatus described may be varied in many respects without departing from the scope and the spirit of my invention. For instance, all the parts need not be located within a single bulb. For example, the plate 12 may be provided outside of its bulb. Or the plate 12 may be extended to form part of the bulb wall. It will be clear to anyone skilled in the art that my novel means and combinations of means may be employed for quite a number of widely different purposes. I may still add that they may be used, inter alia, as a generator of radio frequency alternating currents through the utilization of any of the well-known hook-ups for that purpose, but with the strength of such radio frequency alternating currents governed directly by light impulses.

What I claim as my invention and desire to secure by United States Letters Patent, is:

1. Means in combination for transforming light impulses into electric current impulses comprising a cathode, a grid and a plate, a plate circuit including a source of current for the traverse of said electric current impulses; a photo-electric body adapted to be subjected to light impulses; an envelope for maintaining said body in a cooperative atmosphere; provisions tending to produce and maintain a negative normal potential for said body but themselves incapable of maintaining said potential when said body is being subjected to light; and a link-means electrically connecting said body and said grid and adapted to impart potential variations to said grid corresponding to those which take place on said body.

2. The combination as characterized in claim 1 and further specified by the fact that a high resistance is connected between said body and said cathode.

3. In combination, a photo-electric couple having an envelope to maintain it in a cooperative atmosphere and comprising a photo-electric cathode-body, adapted to be subjected to light impulses, and an anode; a cathode, a grid and a plate; a source of direct current and a leakage resistance connected in series with said photo-electric couple, the negative terminal of said source having a connection with said cathode and leading to said cathode-body and the positive terminal of said source leading to said anode; and a link-means electrically connecting said cathode-body and said grid and adapted to impart potential variations to said grid corresponding to those which take place on said body in response to said light impulses, whereby appreciable corresponding impulses in electron-flow to said plate are effected.

4. In combination, a photo-electric couple having an envelope to maintain it in a cooperative atmosphere and comprising a cathode-body, adapted to be subjected to light impulses, and an anode adapted to receive the electrons shed by said cathode-body; a cathode, a grid and a plate and a plate circuit for the passage of current impulses; provisions tending to produce and maintain a negative normal potential for said cathode-body; and a link-means electrically connecting said anode and said grid and adapted to impart potential variations to said grid corresponding to those which take place on said anode due to the reception of electrons from said cathode-body.

5. In combination, a photo-electric couple having an envelope to maintain it in a cooperative atmosphere and comprising a cathode-body, adapted to be subjected to light impulses, and an anode adapted to receive the electrons shed by said cathode-body; a cathode, a grid and a plate and a plate circuit for the passage of current impulses; provisions tending to produce and maintain a negative normal potential for said cathode-body; and a link-means electrically connecting said anode and said grid and adapted to impart potential variations to said grid corresponding to those which take place on said anode due to the reception of electrons from said cathode-body; and a leak resistance connected between said link-means and said cathode.

6. The combination as characterized in claim 4 and further specified by the fact that said link-means is a direct conductive connection.

7. The combination as characterized in claim 5 and further specified by the fact that said link means is a direct conductive connection.

8. In combination a photo-electric couple in a cooperative atmosphere; a current-strength-controller operating by reason of changes in potential; a link-means electrically connecting one electrode of said photo-electric couple with said current-strength-controller and adapted to impart potential variations to said controller corresponding to those which take place on said electrode; and provisions tending to produce and maintain a negative normal potential for the cathode of said photo-electric couple, but said provisions being incapable of maintaining an unchanged normal potential upon that electrode of said photo-electric couple which is electrically connected with said current strength controller.

9. In combination a photo-electric-cathode-body exposable to light variations and in a cooperative atmosphere; a grid which controls a current flow by reason of potential; and a link-means between said cathode-body and said grid to control the potential of said grid by potential changes in said cathode-body; and provisions in addition to said link-means tending to maintain a fixed charge on said cathode-body.

10. Means in combination for transforming light impulses into electric current impulses including an electron emitting cathode, a grid and a plate; a plate circuit including a source of direct current and forming the circuit for said current impulses; a photo-electric cathode-body; an anode for said photo-electric cathode-body; an electric connection between said photo-electric cathode-body and said grid of such character as to impart substantially instantaneously a change of potential in said photo-electric cathode-body to said grid; provisions in addition to said electric connection between said photo-electric cathode body and said grid for negatively charging said photo-electric cathode-body; and provisions for exposing said photo-electric cathode-body to light impulses, whereby substantially instantaneous electro-static potential changes in response to said light impulses are made by the instantaneous liberation of electrons from said photo-electric cathode-body to effect simultaneous potential changes upon said grid which in turn effects corresponding appreciable current changes in said plate circuit.

11. A method of transforming light variations into electric current variations, which consists in submitting a photo-electric body enclosed by a bulb which is exhausted of air to the influence of a stream of electrons flowing from a source of electrons, subjecting said body to the action of a variable exterior source of light, and associating such body with an electric circuit so that the strength of the current of such circuit will be varied in accordance with the variations of the source of light.

12. A method of transforming light variations into electric current variations, as claimed in claim 1 in which the stream of electrons flowing from said source of electrons is submitted to the governing influence of a body provided in the path of the said electrons.

13. A method of transforming light variations into electric current variations, which consists in submitting a photo-electric body enclosed by a bulb which is filled with rarefied neutral gas to the influence of a stream of electrons flowing from a source of electrons, subjecting said body to the action of a variable exterior source of light, and associating such body with an electric circuit, so that the strength of the current of such circuit will be varied in accordance with the variations of the source of light.

14. Means for transforming light impulses into electric current impulses including a bulb, electron emitting means arranged in said bulb and a photo-electric body spaced apart from but associated with said electron emitting means so as to be influenced by the stream of electrons emitted from said electron emitting means, such photo-electric body being adapted to be submitted to the action of a variable source of light.

15. Means for transforming light impulses into electric current impulses including a bulb, an electron emitting means arranged in said bulb, a photo-electric body spaced apart from but associated with said electron emitting means so as to be influenced by the stream of electrons emitted from said electron emitting means, such photo-electric body being adapted to be submitted to the action of a variable source of light, and a plate member also arranged in said bulb.

16. Means for transforming light impulses into electric current impulses including a bulb, an electron emitting means arranged in said bulb, a photo-electric body spaced apart from but associated with said electron emitting means so as to be influenced by the stream of electrons emitted from said electron emitting means, such photo-electric body being adapted to be submitted to the action of a variable source of light, a metal plate arranged in said bulb, and a grid also arranged in said bulb.

17. Means for transforming light impulses into electric current impulses including a bulb, an electron emitting means arranged in said bulb, a photo-electric body spaced apart from but associated with said electron emitting means so as to be influenced by the stream of electrons emitted from said electron emitting means, such photo-electric body being adapted to be submitted to the action of a variable source of light and individual contacts for the electron emitting means and photo-electric body arranged externally of said bulb.

18. Means for transforming light impulses into electric current impulses including a bulb, an electron emitting means arranged in said bulb, a photo-electric body spaced apart from but associated with said electron emitting means so as to be influenced in the stream of electrons emitted from said electron emitting means, said photo-electric body being adapted to be submitted to the action of a variable source of light, a plate member also arranged in said bulb, and individual contacts for the electron emitting means, photo-electric body and plate arranged externally of said bulb.

19. Means for transforming light impulses into electric current impulses including a bulb, an electron emitting means arranged in said bulb, a photo-electric body spaced apart from but associated with said electron emitting means so as to be influenced by the stream of electrons emitted from said electron emitting means, such photo-electric body being adapted to be submitted to the action of a variable source of light, a metal plate arranged in said bulb, and a grid also arranged in said bulb and individual contacts for the electron emitting means, photo-electric body, plate and grid, arranged externally of said bulb.

20. Means for transforming light impulses into electric current impulses including a bulb, a filament arranged in said bulb and a photo-electric body spaced apart from but associated with said filament so as to be influenced by the stream of electrons emitted from said filament, such photo-electric body being adapted to be submitted to the action of a variable source of light.

21. Means for transforming light impulses into electric current impulses including a bulb, a filament arranged in said bulb, a photo-electric body spaced apart from but associated with said filament so as to be influenced by the stream of electrons emitted from said filament, such photo-electric body being adapted to be submitted to the action of a variable source of light, and a plate member also arranged in said bulb.

22. Means for transforming light impulses into electric current impulses including a bulb, a filament arranged in said bulb, a photo-electric body spaced apart from but associated with said filament so as to be influenced by the stream of electrons emitted from said filament, such photo-electric body being adapted to be submitted to the action of a variable source of light, a metal plate arranged in said bulb, and a grid also arranged in said bulb.

23. Means for transforming light impulses into electric current impulses including a bulb, a filament arranged in said bulb, a photo-electric body spaced apart from but associated with said filament so as to be influenced by the stream of electrons emitted from said filament, such photo-electric body being adapted to be submitted to the action of a variable source of light and individual contacts for the filament and photo-electric body arranged externally of said bulb.

24. Means for transforming light impulses into electric current impulses including a bulb, a filament arranged in said bulb, a photo-electric body spaced apart from but associated with said filament so as to be influenced by the stream of electrons emitted from said filament, such photo-electric body being adapted to be submitted to the action of a variable source of light, a plate member also arranged in said bulb, and individual contacts for the filament, photo-electric body and plate arranged externally of said bulb.

25. Means for transforming light impulses into electric current impulses including a bulb, a filament arranged in said bulb, a photo-electric body spaced apart from but associated with said filament so as to be influenced by the stream of electrons emitted from said filament, such photo-electric body being adapted to be submitted to the action of a variable source of light, a metal plate arranged in said bulb, and individual contacts for the filament, photo-electric body, plate and grid, arranged externally of said bulb.

26. Means for transforming light impulses into electric current impulses including a bulb, electron emitting means arranged in said bulb, and a photo-electric body spaced apart from said electron emitting means but exposed to the electrons emitted by said electron emitting means, such photo-electric body being adapted to be submitted to the action of a variable source of light.

27. Means for transforming light impulses into electric current impulses including a bulb, electron emitting means arranged in said bulb, a photo-electric body associated with said electron emitting means so as to be influenced by the stream of electrons emitted therefrom, said photo-electric body being in the form of a concave mirror, and an electrode in the focus of said mirror.

28. Means for transforming light impulses into electric current impulses including a bulb, electron emitting means arranged in said bulb, a photo-electric body associated with said electron emitting means so as to be influenced by the stream of electrons emitted therefrom, said photo-electric body being in the form of a concave mirror, a metal plate within said bulb and a grid also within said bulb, an electrode in the focus of said mirror said photo-electric body having a metallic connection with the grid and the electrode having a metallic connection with the electron-emitting means.

29. Means for transforming light impulses into electric current impulses comprising a bulb, electron emitting means, arranged in said bulb, a photo-electric body exposed to the electrons emitted by said electron emitting means so as to have a static potential imparted thereto by said electrons, said photo-electric body being adapted to be submitted to a varying source of light so that the potential thereof imparted thereto by said electrons may be caused to vary in accordance with the variations in the strength of such light, and means whereby such variations in the static potential of said photo-electric body may cause corresponding variations in the electric current in one or more circuits.

30. A method of transforming light variations into electric current variations which comprises submitting a photo-electric body to the potential restoring influence of a source of negative charge capable of substantially completely restoring the potential of said photo-electric body after electrons are emitted therefrom in response to light, but incapable of maintaining the potential of said photo-electric body when it is being subjected to light; subjecting said photo-electric body to the action of a variable source of light and thereby effecting corresponding potential changes in said photo-electric body; and imparting the controlling effect of said potential changes in said photo-electric body to the stream of cathode emitted free electrons of a plate circuit.

31. Apparatus in combination for transforming light impulses into current impulses comprising the three elements of a thermionic relay—a grid, a cathode and a plate; the two elements of a photo-electric cell—an anode and a cathode-body; walls forming chambers capable of maintaining a vacuum, one of said chambers containing said three elements of a thermionic relay and the other of said chambers containing said two elements of a photo-electric cell; leads and terminal contacts for said three elements of a thermionic relay fixed for socket mounting at one locality of said walls; and independent leads for connecting said anode and said cathode-body respectively with said plate and said grid in a different wall-locality from that of said leads and terminal contacts and by substantially the shortest paths.

THEODORUS H. NAKKEN.